United States Patent [19]

Kato et al.

[11] Patent Number: 4,914,707

[45] Date of Patent: Apr. 3, 1990

[54] BALANCED VEHICULAR SPEAKER SYSTEM

[75] Inventors: Shinjiro Kato; Toshikazu Yoshimi; Hideo Yamamoto; Takeshi Sato; Hisashi Kihara, all of Saitama, Japan

[73] Assignee: Pioneer Electronic Corporation, Tokyo, Japan

[21] Appl. No.: 193,136

[22] Filed: May 6, 1988

Related U.S. Application Data

[63] Continuation of Ser. No. 902,893, Sep. 2, 1986, abandoned.

[30] Foreign Application Priority Data

Sep. 2, 1985 [JP] Japan ........................... 60-134969[U]

[51] Int. Cl.[4] ............................................. H04B 1/00

[52] U.S. Cl. ....................................... 381/86; 381/109

[58] Field of Search .................. 381/82, 86, 104, 111, 381/116, 117, 120, 124, 98, 109

[56] References Cited

U.S. PATENT DOCUMENTS 3,397,286 8/1968 Prewitt et al. ........................ 381/24

4,573,189 2/1986 Hall ...................................... 381/96

*Primary Examiner*—Forester W. Isen

*Attorney, Agent, or Firm*—Sughrue, Mion, Zinn, Macpeak & Seas

[57] ABSTRACT

A speaker system for a vehicle having both front and rear speakers. Both speakers are connected in parallel to an amplifier. The impedance of the rear speaker circuit is made greater than that of the front speaker circuit. A resistor may be placed in series with the rear speaker or a shorting ring may be attached to the coil of the front speaker to decrease the high frequency impedance.

7 Claims, 3 Drawing Sheets

BALANCED VEHICULAR SPEAKER SYSTEM

This is a continuation of application Ser. No. 902,893, filed Sept. 2, 1986, now abandoned.

BACKGROUND OF THE INVENTION

1. Field of the Invention

This invention relates to an acoustic device, specifically one for being installed in a vehicle.

2. Background Art

The interior configuration of a vehicle is quite complicated and it imposes restrictions on the arrangement of speakers within its interior. The sound pressure level of the acoustic power generated by a speaker and the sound quality consequently vary with the position where a listener is seated. FIG. 1 shows an example of the arrangement of front speakers 1 and rear speakers 2. In order to minimize the problem of sound variation within the vehicle, the audio signal output of an amplifier 3 is, as shown in FIG. 2, supplied to the front and rear speakers 1 and 2 connected in series thereto through a so-called power feeder 4 which divides its output in a conventional vehicular acoustic device. The power feeder 4 is formed with a circuit having two variable resistors 41 and 42 connected in series and the circuit is connected to the outputs of the amplifier 3 at one end and to both ends of the series speaker circuit consisting of the speakers 1 and 2 at the other. For a stereo speaker system, there are two such series circuits with respective ganged power feeders 4. Moreover, the contact points between the variable resistors 41 and 42 are connected to the contact points between the speakers 1 and 2.

The acoustic power levels of the speakers 1 and 2 are each adjusted by adequately setting the resistances of the variable resistors 41 and 42 thus arranged and the desired sound pressure level is set in a fixed listening position. However, it is troublesome to make such adjustment according to the listening position and changes in sound quality resulting from changes in the listening position have not properly been dealt with.

SUMMARY OF THE INVENTION

Accordingly, an object of the present invention is to provide an acoustic device for a vehicle, whose sound pressure level and sound quality, as experienced by a listener, are set roughly uniform in each listening position inside the vehicle.

In the acoustic device intended to accomplish the above object, the acoustic power and high frequency response of a given speaker are preset in corresondence to the relative position of the speaker which controls the sound pressure and sound quality in the neighborhood of a listening position. The setting of the power and frequency response takes into account the acoustic propagation characteristics of the space through which the acoustic energy is given off by the speaker.

DETAILED DESCRIPTION OF THE PREFERRED EMBODIMENTS

Figure 1:
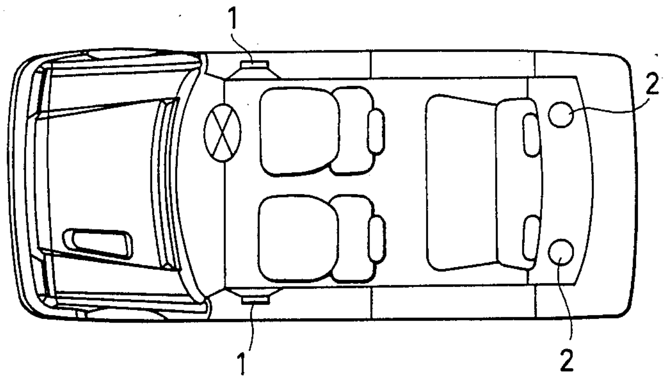
FIG. 1 is an example of an arrangement of speakers inside a vehicle.
Figure 2:
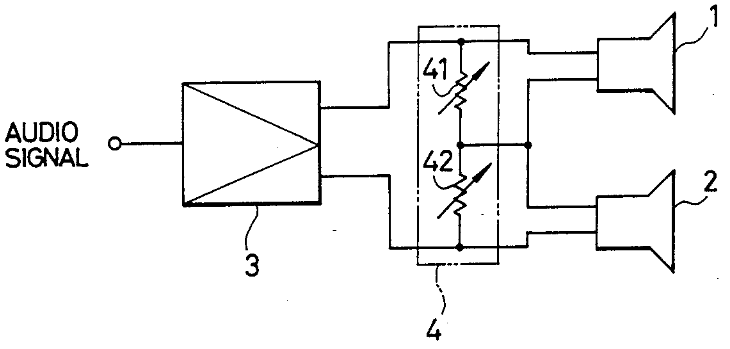
FIG. 2 PRIOR ART
FIG. 2 is a block diagram of a conventional acoustic device for a vehicle.
Figure 3:
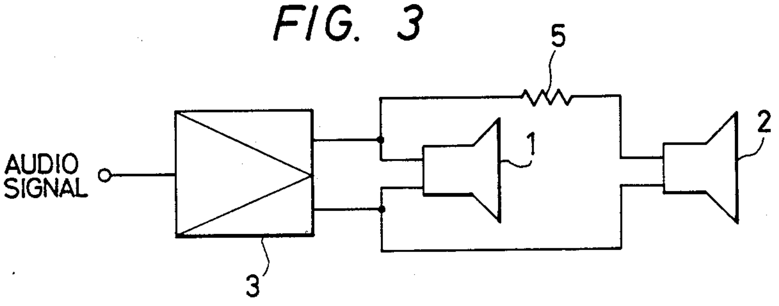
FIG. 3 is a block diagram of an embodiment of the present invention.

Referring now to FIG. 3, an acoustic device embodying the present invention will be described. In FIG. 3, like reference characters are given to like components parts of FIG. 2. An audio signal supplied by a sound source, such as a tuner (not shown) or the like, is supplied to an amplifier 3. The audio signal amplified by the amplifier is supplied to a front speaker 1 and a rear speaker 2 connected in parallel to each other. A resistor 5 is directly connected in series to the rear speaker 2. In comparison with the speaker 1 installed, e.g., in the front door, the rear speaker 2 is installed relatively closer to the listening position, e.g., installed beneath the parcel tray. Accordingly, the impedance of the rear speaker 2 is set to be greater than that of the front speaker 1 and the output sound pressure level of the rear speaker 2 is lower than that of the front speaker 1.

Given that the impedance of the speakers 1 and 2 are $Z_{p1}$ and $Z_{p2}$ respectively and the impedance of the resistor 5 is R, the load impedance $Z_L$ of the amplifier 3 becomes $1/Z_L=1/Z_{p1}+1/(Z_{p2}+R)$. Consequently, the impedance R of the resistor 5 is set in such a manner as to make the load impedance $Z_L$ not lower than the rated load impedance of the amplifier 3 and to achieve the desired acoustic power level difference between the front and rear speakers 1 and 2. The rated load impedance of an audio amplifier for a vehicle is generally 4 ohms. As set forth above, the impedance of the amplifier 3 and each speaker can be matched the other by regulating the impedance R of the resistor 5. Besides, the difference in the acoustic power level between the amplifier 3 and the rear speaker 2 is adjustable. Reduction in the damping factor resulting from the insertion of the resistor 5 is ignorable in practice because the impedance $Z_{p2}$ of the rear speaker 2 with the resistor 5 inserted in series is relatively high.

Figure 4:
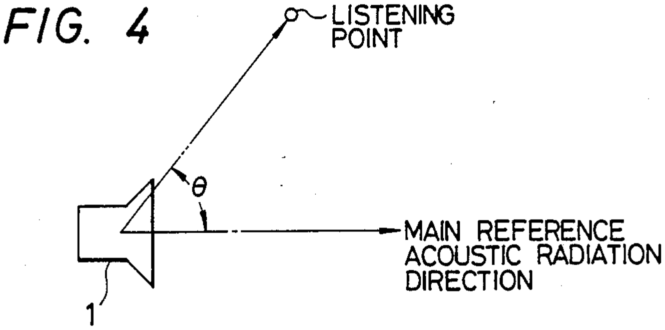
FIG. 4 is a diagram illustrating the relation between the principal direction of radiation of a speaker and a listening position.
Figure 5:
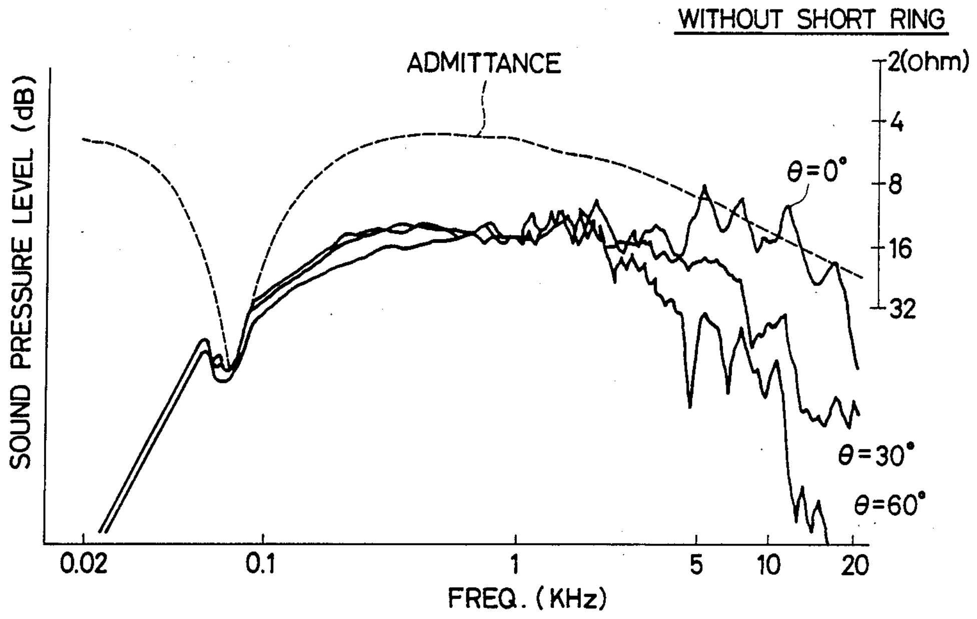
FIGS. 5 and 6 are graphs showing the output acoustic pressure frequency characteristics of the speakers.

A description will be given of the sound quality varying with the change in the position at which the sound from the speaker is listened to. Assume that the listening point is positioned a given distance apart from the speaker 1 in a direction at an angle of theta with respect to the principal reference acoustic radiation (principal radiation) direction of the speaker 1. This principal radiation direction is illustrated in FIG. 4 as the axis of the speaker 1. FIG. 5 shows the output sound pressure frequency characteristics in the above listening point at angles theta of 0 degree, 30 degrees and 60 degrees. As shown in FIG. 5, the high frequency response decreases as the angle theta increases. In consequence, according to the present invention, the lowered portion of the above high frequency response has been compensated in accordance with the angle theta when the listening position is not located in the neighborhood of the main radiation direction of the speaker. The compensation for the high frequency response may be implemented by, e.g., changing the mass of the voice coil or material and shape of the cone. According to this embodiment, however, the high frequency response is increased by equipping the pole piece of the magnet of the speaker with a shorting ring and by suppressing the reduction of the admittance at high frequencies caused by an increase in the inductance of the voice coil at high frequencies.

Figure 7:
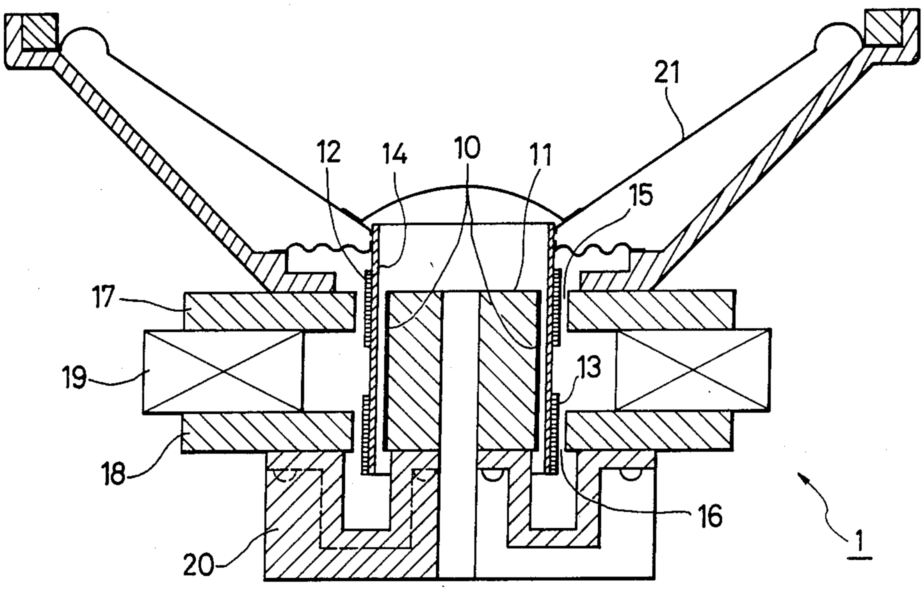
FIG. 7 is a sectional illustration of a shorting ring in a speaker.

A shorting ring is included in a speaker in order to eliminate distortion in the current flowing in a voice coil of a speaker caused by the influence of the magnetic circuit located in the vicinity of the voice coil. As shown in the speaker 1 of FIG. 7, a shorting ring 10 is plated on the sides of a center pole 11. Alternatively, the shorting ring could be fabricated as a copper cap. The center pole 11 is located in the center of voice coil 12 and 13 affixed to a voice coil bobbin 14. Air gaps 15 and 16 exist between the voice coils 12 and 13 on one side and plates 17 and 18 are the other sides. A magnet 19 is axially attached between the plates 17 and 18. The center pole 1 and the plates 17 and 18 are supported by a pole support 20. The outer circumference of a diaphragm 21 is fixed in relation to the plate 16 and the center pole 1 while an inner circumference of the diaphragm 20 is fixed to the voice coil bobbin 14 and thus to the voice coils 12 and 13.

Figure 6:
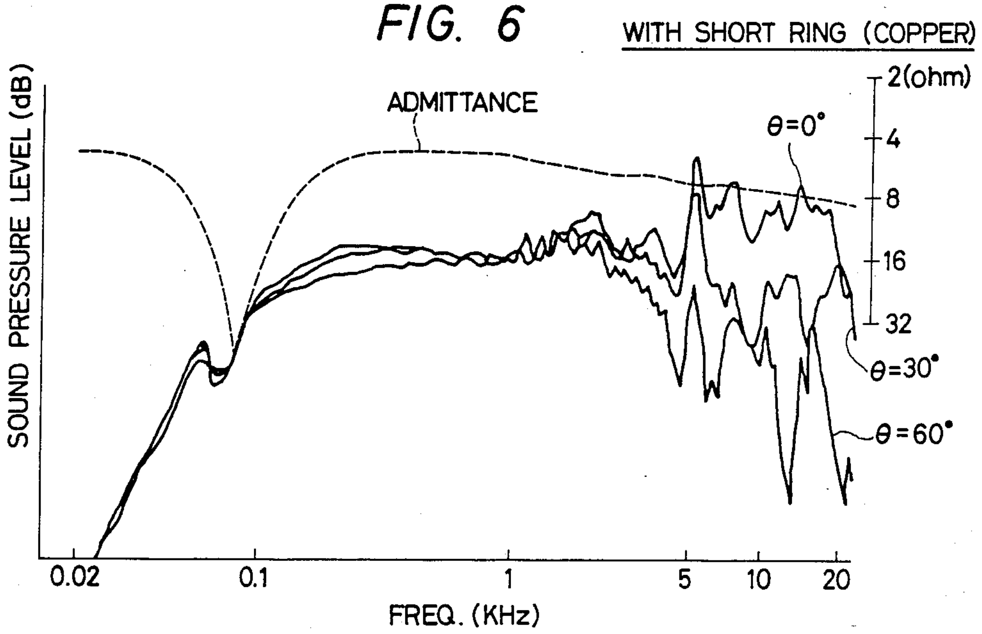

Various high frequency response characteristics are obtainable by changing the intrinsic resistance and thickness of the above shorting ring and therefore the shorting ring prepared from gold, silver, anoxic copper, copper, aluminum or the like is selected properly as occasion demands. FIG. 6 shows an example of the output sound pressure frequency characteristics when the shorting ring is formed of copper.

The front speaker 2 acts to control the sound field in the front seat and its neighborhood. The distance from the listening point in the front seat to the front speaker 2 is greater than the distance from passengers in the rear seat to the rear speaker 2 and has a larger angle of theta. Thereby the front speaker 1 is set in such a manner that its impedance is lower than that of the rear speaker 2, e.g., set at 5 ohms. Furthermore, because the high frequency characteristics of the front speaker 1 tend to decrease off the principal radiation direction, the shorting ring is attached thereto to remedy the disadvantage and allows the output sound pressure level and the high frequency response to be compensated. On the other hand, the high frequency response of the rear speaker 2 is scarcely lowered because it is installed close to the listening point in the rear seat and its acoustic power is reflected from the rear window so that the principal radiation direction is towards the listeners. Even though the acoustic power level of the rear speaker 2 is relatively low, a sound pressure level equivalent to the listening sound pressure level in the front seat is available. In consequence, the impedance of the rear speaker 2 is set at a value greater than that of the front speaker 1 and is capable of obtaining a proper acoustic power level difference.

It thus becomes possible to set the effective spatial relation between the speakers to be arranged in such a manner as to surround the vehicular acoustic space having the configuration determined by the vehicle type. That is, the output sound pressure difference and frequency characteristics for each speaker arranged in the vehicle are based on the propagation distance and the propagation direction or path of the sound emitted from the speaker, so that the listening sound pressure level and sound quality in each listening position are made as equal as possible to corresponding quantities at other positions.

Although the front and rear speakers 1 and 2 have been respectively arranged in both front doors of a vehicle and beneath the parcel tray in the described embodiment, the arrangement of speakers is, needless to say, not limited to what has been shown. Alternatively, the front speakers 1 may be installed in the dashboard or on the cowl side, whereas the rear speaker 2 may be installed in the rear door or the head lining. The number of speakers is not limited to two. Furthermore, the resistor 5 may be replaced with a variable resistor or active element so as to vary the output sound pressure difference.

As set forth above, the impedance of the front speaker which is not installed close to the front seat in view of the configuration of the interior of a vehicle is nonetheless set lower than that of the rear speaker in the acoustic system according to the present invention. Moreover, the proper difference in output sound pressure between the front and rear speakers is provided by attaching the resistor to the rear speaker and the shorting ring is used to compensate for the high frequency response of the front speaker, whereby the listening sound pressure level and the sound quality can effectively be made as equal as possible.

We claim:

1. An acoustic system for a vehicle comprising:

an amplifier for amplifying an audio signal;

a front speaker disposed in a front portion of an interior of a vehicle and forming a front speaker circuit;

a rear speaker disposed in a rear portion of said interior and forming a rear speaker circuit, said front and rear speaker circuits being connected in parallel to an output of said amplifier;

an impedance means having a predetermined value serially connected to said rear speaker in said rear speaker circuit such that the impedance of the rear speaker circuit is greater than the impedance of the front speaker circuit, the predetermined value of said impedance means being of such value to cause the sound pressure level received by a rear seat occupant of said vehicle from said rear speaker to be substantially equal to the sound pressure level received by a front seat occupant of said vehicle from said front speaker; and means connected to said front speaker for causing the ratio of the high frequency impedance to the low frequency impedance of said front speaker to be smaller than the ratio of the corresponding high frequency impedance to the corresponding low frequency impedance of said rear speaker.

2. An acoustic system as recited in claim 1, wherein said impedance means is a resistor connected in series with a voice coil of said rear speaker to reduce its acoustic power level.

3. A method of constructing an acoustic system for a vehicle comprising the steps of:

providing an amplifier for amplifying an audio signal;

providing a front speaker disposed in a front portion of an interior of a vehicle and forming a front speaker circuit;

providing a rear speaker disposed in a rear portion of said interior and forming a rear speaker circuit;

connecting said front and rear speaker circuits in parallel to an output of said amplifier;

serially connecting an impedance means having a selected predetermined value to said rear speaker in said rear speaker circuit such that the impedance of the rear speaker circuit is greater than the impedance of the front speaker circuit;

selecting the predetermined value of said impedance means to be of such value to cause the sound pressure level received by a rear seat occupant of said vehicle from said rear speaker to be substantially equal to the sound pressure level received by a front seat occupant of said vehicle from said front speaker; and connecting a shorting ring to said front speaker to cause the ratio of the high frequency impedance to the low frequency impedance of said front speaker to be smaller than the ratio of the corresponding high frequency impedance to the corresponding low frequency impedance of said rear speaker.

4. An acoustic system for a vehicle comprising:

an amplifier for amplifying an audio signal;

a front speaker disposed in a front portion of an interior of a vehicle and forming a front speaker circuit;

a rear speaker of like construction as said front speaker disposed in a rear portion of said interior and forming a rear speaker circuit, said front speaker circuit and said rear speaker circuit being connected in parallel to an output of said amplifier; and means connected to said front speaker for causing the ratio of high frequency impedance to the low frequency impedance of said front speaker to be smaller than the ratio of the corresponding high frequency impedance to the corresponding low frequency impedance of said rear speaker.

5. An acoustic system as claimed in claim 4, further including an impedance means having a predetermined value serially connected to said rear speaker in said rear speaker circuit such that the impedance of the rear speaker circuit is greater than the impedance of the front speaker circuit such that the acoustic power level of the rear speaker circuit is maintained less than that of the front speaker circuit.

6. An acoustic speaker as recited in claim 4, wherein said means connected to said front speaker includes a shorting ring.

7. An acoustic speaker as recited in claim 6, wherein said shorting ring is attached to a center pole of said front speaker.

* * * * *